United States Patent
Kennedy

(10) Patent No.: US 9,220,190 B2
(45) Date of Patent: Dec. 29, 2015

(54) SEED PANEL

(71) Applicant: UFP Technologies, Inc., Georgetown, MS (US)

(72) Inventor: Gregory Kennedy, San Buenaventura, CA (US)

(73) Assignee: UFP TECHNOLOGIES, INC., Georgetown, MA (US)

( * ) Notice: Subject to any disclaimer, the term of this patent is extended or adjusted under 35 U.S.C. 154(b) by 0 days.

(21) Appl. No.: 14/311,961

(22) Filed: Jun. 23, 2014

(65) Prior Publication Data

US 2014/0298720 A1 Oct. 9, 2014

Related U.S. Application Data

(62) Division of application No. 13/796,016, filed on Mar. 12, 2013, now abandoned, which is a division of application No. 13/206,857, filed on Aug. 10, 2011, now abandoned.

(60) Provisional application No. 61/372,696, filed on Aug. 11, 2010.

(51) Int. Cl.
*A01C 1/04* (2006.01)
*A01G 9/10* (2006.01)

(52) U.S. Cl.
CPC . *A01C 1/044* (2013.01); *A01G 9/10* (2013.01); *Y10T 156/10* (2015.01); *Y10T 156/1052* (2015.01)

(58) Field of Classification Search
CPC ........... A01C 1/04; A01C 1/042; A01C 1/044
USPC ....................... 47/9, 15, 56; 206/423; 111/199
See application file for complete search history.

(56) References Cited

U.S. PATENT DOCUMENTS

| 2,281,927 A | 5/1942 | Fisher |
| 3,098,320 A | 7/1963 | Estowski et al. |

(Continued)

FOREIGN PATENT DOCUMENTS

| DE | 298 15 809 U1 | 12/1998 |
| DE | 202 14 508 U1 | 2/2004 |

(Continued)

OTHER PUBLICATIONS 7-11 Slurpee Coins on Apr. 7, 2010 using Internet <URL:http://www.ericscards.com/coins>, 1 page.

(Continued)

*Primary Examiner* — Trinh Nguyen
(74) *Attorney, Agent, or Firm* — Howard & Howard Attorneys PLLC

(57) ABSTRACT

A composite article comprises a substrate element with a first cover element spaced from the substrate element. A second cover element is disposed between the first cover element and the substrate element. A first adhesive layer is disposed between the first and second cover elements, where the first adhesive layer is configured to adhere the first cover element to the second cover element. A second adhesive layer is disposed between the second cover element and the substrate element, where the second adhesive layer is configured to adhere the second cover element to the substrate element. At least one seed abuts the first adhesive layer. The first cover layer is configured to be separated from the first adhesive layer thereby exposing at least a portion of the seed(s). Also disclosed are a method of forming a composite article, and a method of planting a seed with a composite article.

11 Claims, 10 Drawing Sheets

(56) References Cited

U.S. PATENT DOCUMENTS

| | | | |
|---|---|---|---|
| 3,098,321 | A | 7/1963 | Estowski |
| 3,659,396 | A | 5/1972 | Baker |
| 3,908,308 | A | 9/1975 | Meyers |
| 4,080,755 | A | 3/1978 | Crosby |
| 4,173,844 | A | 11/1979 | Knolle et al. |
| 4,272,919 | A | 6/1981 | Schmidt |
| 4,318,248 | A * | 3/1982 | Muldner .................... 47/56 |
| 4,353,183 | A | 10/1982 | Estkowski |
| 4,418,497 | A | 12/1983 | Mastriano |
| 4,442,627 | A | 4/1984 | Adams et al. |
| 5,210,975 | A | 5/1993 | Beckerman |
| 5,239,774 | A | 8/1993 | Rickabaugh |
| 5,417,010 | A | 5/1995 | Ecer |
| 5,720,129 | A | 2/1998 | Lantinberg |
| 5,771,614 | A | 6/1998 | Dawson |
| 6,240,674 | B1 | 6/2001 | Otake et al. |
| 6,389,745 | B1 * | 5/2002 | Huh .................... 47/56 |
| 6,684,561 | B2 | 2/2004 | Poret et al. |
| 6,701,664 | B2 | 3/2004 | Ahm |
| 6,792,714 | B1 | 9/2004 | Lyons |
| 6,945,785 | B2 | 9/2005 | Sohl et al. |
| 7,438,224 | B1 | 10/2008 | Jensen et al. |
| 7,641,112 | B2 | 1/2010 | Jensen et al. |
| 7,735,250 | B2 | 6/2010 | Menzie et al. |
| 2002/0000064 | A1 | 1/2002 | D'Agnone et al. |
| 2002/0040670 | A1 | 4/2002 | Hornak |
| 2003/0173244 | A1 * | 9/2003 | Eichman .................... 206/423 |
| 2006/0107561 | A1 | 5/2006 | Menzie et al. |
| 2006/0162248 | A1 | 7/2006 | Ahm |
| 2008/0046277 | A1 | 2/2008 | Stamets |
| 2010/0006461 | A1 | 1/2010 | Shaffer et al. |
| 2011/0302835 | A1 | 12/2011 | Ray et al. |

FOREIGN PATENT DOCUMENTS

| | | |
|---|---|---|
| FR | 2 584 983 A1 | 1/1987 |
| FR | 2 707 832 A1 | 1/1995 |
| GB | 2 281 713 A | 3/1995 |
| GB | 2 304 624 A | 3/1997 |
| GB | 2 460 413 A | 12/2009 |
| JP | 1990227296 A | 9/1990 |
| WO | WO 94 16907 A1 | 8/1994 |
| WO | WO 2007 050282 A3 | 5/2007 |
| WO | WO 2009 156855 A2 | 12/2009 |

OTHER PUBLICATIONS

Bloomin' Promotions on Apr. 7, 2010 using Internet <URL:http://www.bloominpromotions.com/cupcooler.html>, 1 page.

Botancial Paperworks on Apr. 7, 2010 using Internet <URL:http://www.botanicalpaperworks.com>, 1page.

Flower Seed Paper on Apr. 7, 2010 using Internet <URL:http://www.flowerseedpaper.com>, 2 pages.

Green Field Paper Company on Apr. 7, 2010 using Internet <URL:http://www.greenfieldpaper.com>, 5 pages.

English Language Abstract for DE 298 15 809 U1 extracted from the espacenet.com database on Oct. 6, 2011, 8 pages.

English language abstract and machine-assisted translation for German Patent No. DE 202 14 508 U1 extracted from the espacenet.com database on Jun. 12, 2013, 12 pages.

English language abstract and machine-assisted translation for French Patent No. FR 2 584 983 A1 extracted from the espacenet.com database on Jun. 12, 2013, 10 pages.

English language abstract and machine-assisted translation for French Patent No. FR 2 707 832 A1 extracted from the espacenet.com database on Jun. 12, 2013, 15 pages.

English Language Abstract for JP 2-227296 A extracted from the espacenet.com database on Oct. 6, 2011, 8 pages.

Offer for Sale of a fold up CD sleeve with laminated low-grow wild flower mix seed panel, Aug. 6, 2009, 1 page.

* cited by examiner

SEED PANEL

CROSS REFERENCE TO RELATED APPLICATION

This application is a divisional application of U.S. patent application Ser. No. 13/796,016, filed on Mar. 12, 2013, which is a divisional application of U.S. patent application Ser. No. 13/206,857, filed on Aug. 10, 2011, which claims the benefit of U.S. Provisional Patent Application Ser. No. 61/372,696, filed on Aug. 11, 2010. The contents of U.S. patent application Ser. Nos. 13/796,016, 13/206,857, and 61/372,696 are hereby incorporated by reference in their entirety.

BACKGROUND

1. Field of the Invention

The subject invention relates to a composite article and more specifically to a composite article including seed for planting.

2. Description of the Related Art

Supplying plantable seeds with products is generally known in the art. Many of these products include different types of seeds embedded therein. For example, various articles formed from paper and/or fibers, such as greeting and transactional cards, have seeds integrated within the paper/fibers themselves. Alternatively, removable portions or decorative elements that include seeds embedded therein may be used to adorn the cards. Still other examples of similar products include dishes and cutlery having seeds embedded therein.

Typically, to plant the seeds, the entire card or product may be planted. However, planting an entire card or product is generally not desirable because the message or information disposed on the card will be lost. Moreover, even if only a portion of the card or product contains the seeds to be planted, the material surrounding the seeds must break down before the seeds are able to germinate. Thus, planting an entire card or product is not desirable. Additionally, waiting for the material surrounding the seed to break down may delay or even prevent the seeds from ever germinating. Accordingly, there remains an opportunity to develop an improved article including seeds.

SUMMARY

A composite article comprises a substrate element with a first cover element spaced from the substrate element. A second cover element is disposed between the first cover element and the substrate element. A first adhesive layer is disposed between the first and second cover elements, where the first adhesive layer is configured to adhere the first cover element to the second cover element. A second adhesive layer is disposed between the second cover element and the substrate element, where the second adhesive layer is configured to adhere the second cover element to the substrate element. At least one seed abuts the first adhesive layer. The first cover layer is configured to be separated from the first adhesive layer thereby exposing at least a portion of the seed(s).

A method of forming the composite article comprises the steps of applying an adhesive to a first cover element to form a first adhesive layer, applying at least one seed to the first adhesive layer, applying a second cover element to the first adhesive layer with the at least one seed disposed between the first adhesive layer and the second cover element, applying a second adhesive layer to the second cover element, and applying the second cover element to the substrate element.

A method of planting the seed with the composite article coupled to a secondary structure is also disclosed herein. The method comprises the steps of removing the composite article from the secondary structure, removing the first cover element from the composite article to expose the seed, and disposing a remaining portion of the composite article in or on a growing medium to plant the seed.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION

Referring to the Figures, wherein like numerals indicate like or corresponding parts throughout the several views an article comprising one or more seeds is generally shown at 20. The article 20 is further defined as a seed panel 20 and will hence forth be described as the seed panel 20.

Figure 1:
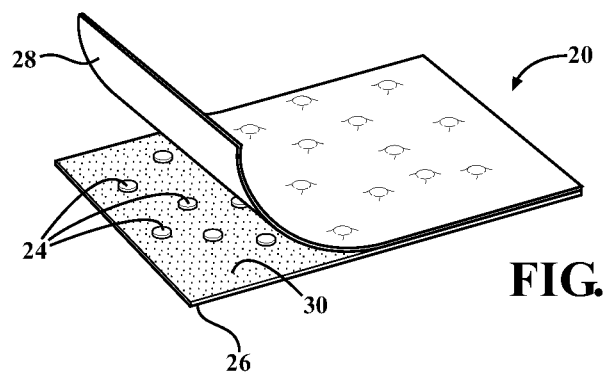
FIG. 1 is a perspective view of a seed panel with a cover element partially peeled off to expose a plurality of seed.
Figure 3:
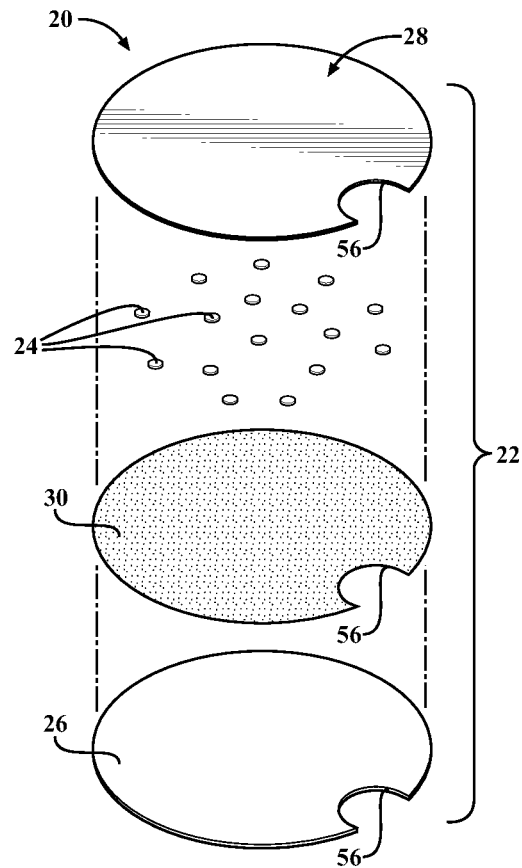
FIG. 3 is an exploded perspective view of another embodiment of the seed panel.

With reference to FIGS. 1 and 3, the seed panel 20 is a multilayered structure comprising a plurality of layers 22. The layers 22 are further defined as a seed layer 24, a substrate element 26, an adhesive layer 30, and a cover element 28. The seed panel 20 typically includes at least one of each of the layers 22. However, the number of layers 22 is not particularly limited, such that the seed panel 20 may include a plurality of any or all of the layers 22. Any of the layers 22 may completely cover or extend beyond adjacent layers 22. Alternatively, any of the layers 22 may only cover or be in contact with a portion of adjacent layers 22.

For clarity purposes, as used herein, the term "seed" refers to one seed or a plurality of seeds. The seed layer 24 typically includes a plurality of seeds; however use of a single seed will not deviate from the scope of this disclosure. It should be noted that the seed is not limited to any particular type of seed. The seed panel 20 may comprise one or a plurality of the same type of seed. Alternatively, the seed panel 20 may include a variety of different types of seed. The seed may include, but is not limited to, flower seed, herb seed, grass seed, fruit seed, vegetable seed, and combinations thereof. The type of seed utilized may depend upon the size, shape, or function of the seed panel 20. The seed is typically spaced from one another in a random, non-contiguous manner within the seed panel 20. Alternatively, the seed may be arranged in a contiguous layer such that the seed abut one another on the seed panel 20.

The seed panel 20 may define any configuration or size related to a desired application. The seed panel 20 of the present disclosure may be utilized in a variety of applications. The seed panel 20 may be affixed to or otherwise coupled to a secondary article. Examples of the secondary article includes, but is not limited to, cup bottoms, book marks, business cards, cartons, boxes, envelopes, compact disc (CD) sleeves, packaging, bottle hang tags, price tags, other die cut components, or any other application. Alternatively, the seed panel 20 may itself be one of the aforementioned articles. In other words, the seed panel 20 may be integrated into the article itself. Both alternatives will be explained in greater detail below.

The substrate element 26 is typically a semi-rigid material and tends to be environmentally friendly, i.e., biodegradable, meaning that the substrate element 26 will tend to biodegrade. Examples of suitable materials for the substrate element 26 include, but are not limited to, fiberboard, cardboard, cardstock, paper, fibers, recycled newsprint, and combinations thereof, or the like. However, the substrate element 26 may comprise a plastic, a metal, a paper, a polymer, and the like. Additionally, the substrate element 26 may comprise a flexible or pliable material without deviating from the scope of the present disclosure.

The adhesive layer 30 is typically disposed on the substrate element 26. As used herein, the terminology "disposed on" describes the adhesive layer 30 being in direct contact with the substrate element 26, or spaced from the substrate element 26. Preferably, the adhesive layer 30 is a pressure-sensitive adhesive. However, any other suitable adhesive may also be employed. The adhesive layer 30 is not particularly limited and may include a solid, a gel, or a liquid adhesive. Further the adhesive layer 30 may be a sheet, a film, a gum, or any other structure. Additionally, the adhesive layer 30 may be defined as glue, paste, cement, plaster or the like. The adhesive layer 30 also tends to be environmentally friendly, i.e., biodegradable, meaning that the adhesive will tend to biodegrade. The adhesive layer 30 is typically organic. However it is to be appreciated that the adhesive layer 30 may include one or more silicones without deviating from the scope of this disclosure.

The adhesive layer 30 typically couples the seed layer 24 to the substrate element 26. The seed layer 24 is not necessarily in direct contact with the substrate element 26. The seed layer 24 may be spaced from the substrate layer. The seed layer 24 typically extends from the adhesive layer 30 and away from the substrate layer. Alternatively, the seed layer 24 may be applied to the substrate element 26 prior to the adhesive layer 30 such that the seed layer 24 is in contact with the substrate element 26 and the adhesive layer 30 is applied over the seed layer 24 for coupling the seed layer 24 to the substrate element 26. In other words, the seed layer 24 may extend from the adhesive layer 30 and toward the substrate layer. At least a portion of each seed of the seed layer 24 remains free of the adhesive layer 30. A portion of each seed within the seed layer 24 is exposed when the substrate element 26 and/or the cover element 28 is removed.

The cover element 28 is disposed on the substrate element 26 and over the seed layer 24 and the adhesive layer 30 for protecting the seed layer 24 from damage and to help the seed layer 24 remain secured to the substrate element 26. The cover element 28 is typically coupled to the substrate element 26 through the adhesive layer 30 in areas not occupied by the seed layer 24. It is to be appreciated that the cover element 28 need not be the outer most layer of the seed panel 20 such that additional layers 22 may be disposed on or over the cover element 28. The cover element 28 may be further defined as a release layer, a release coating, a release paper, wax paper, fiberboard, or any suitable material that will allow the cover element 28 to be separated from the substrate element 26 for exposing the seed layer 24. The term "separated" includes peeling, prying, tearing, or otherwise detaching the cover element 28 and the substrate element 26. In various embodiments, the cover element 28 includes one or more silicones including, but not limited to, polydimethylsiloxanes, organopolysiloxanes, and the like. Alternatively, the cover element 28 may include organic and/or inorganic materials. The cover element 28 may also comprise a biodegradable material.

Figure 2:
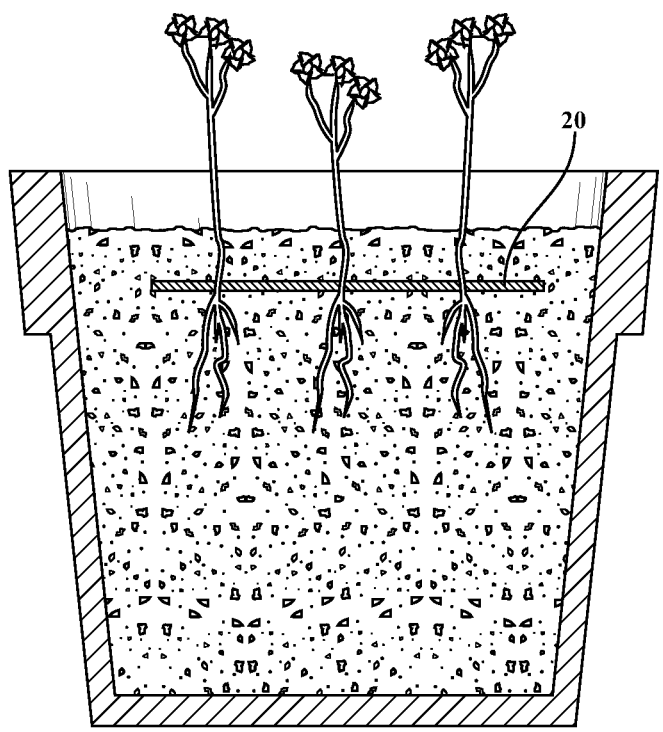
FIG. 2 is a partially cross-sectioned view of the seed panel planted for germinating the seed.

As discussed above, the seed panel 20 may define any shape and is not particularly limited in size. Typically, size and shape are related to the desired application of the seed panel 20. The cover element 28 may be peeled away (or may be peelable) from the substrate element 26 for exposing the seed layer 24 adhered thereto. With the seed layer 24 exposed, the seed panel 20 may be planted for germinating the seed of the seed layer 24, as shown in FIG. 2. Alternatively, when the cover element 28 is removed, thereby exposing the adhesive layer 30, the substrate element 26 and the seed layer 24 may be coupled to the secondary article or another structure via the adhesive layer 30.

FIGS. 3-7 illustrate one exemplary embodiment of the seed panel 20. In this embodiment, the seed panel 20 is adapted to be coupled to a cup 32 having a recessed bottom. The cup 32 is not particularly limited and is typically formed from a paper composition for use with hot beverages, such as coffee, tea, cocoa, or the like. However, it should be appreciated that the cup 32 may be used to house any type of substance, including hot and cold beverages or any other substance such as, but not limited to, oatmeal, soup, cold cereal or a non-edible substance. The cup 32 may define any shape and size. The cup 32 typically includes a generally horizontal bottom wall 34 having an inner surface 36 and an outer surface 38 spaced from the inner surface 36. The cup 32 typically has a peripheral wall 40 that is disposed about the bottom wall 34 and that defines a chamber 42 for housing the substance. The peripheral wall 40 includes an upper end 44 and a lower end 46. The upper end 44 defines an aperture 48 for filling and emptying the cup 32. A lid 50 may be placed over the aperture 48 to enclose the chamber 42 and prevent spillage of the beverage. However, the lid 50 is not required. The bottom wall 34 is proximately spaced from the lower end 46 of the peripheral wall 40 such that the peripheral wall 40 extends beyond the outer surface 38 of the bottom wall 34, and defines a cavity 52 between the lower end 46 and the outer surface 38, with the lower end 46 defining an orifice for accessing the cavity 52. In other words, the cavity 52 is not enclosed on all sides such that the cavity 52 has an "open" bottom. The cavity 52 is not particularly limited in size. When the cup 32 is placed on a relatively flat surface such as a table, a counter, or the like, the lower end 46 of peripheral wall 40 typically supports the cup 32.

Figure 5:
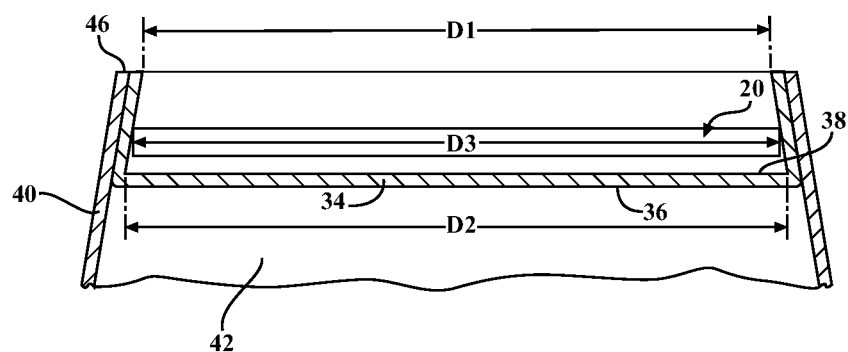
FIG. 5 is a cross-sectional side view of the seed panel disposed within a cup having a recessed bottom.
Figure 4:
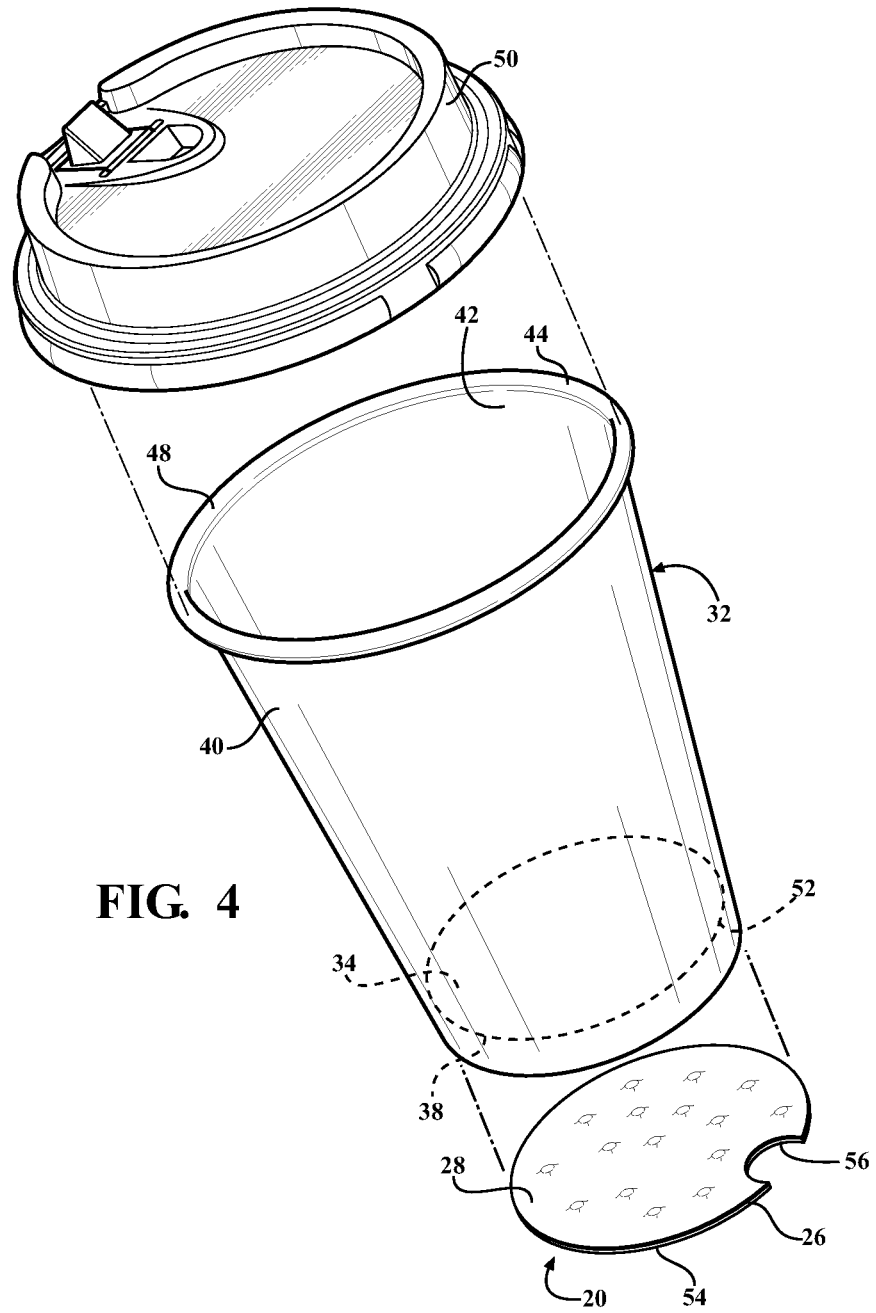
FIG. 4 is a perspective view of the seed panel spaced from a cup.

The cavity 52 typically defines a plurality of diameters between the outer surface 38 of the bottom wall 34 and the lower end 46, as best shown in FIG. 5. The peripheral wall 40 and the outer surface 38 are typically in an acute angular relationship with one another, such that the diameters defined by the peripheral wall 40 decreases, moving away from the bottom wall 34 and toward the lower end 46 of the peripheral wall 40. Said differently, the diameter defined by the peripheral wall 40 immediately adjacent the bottom wall 34 is typically larger than the diameter defined by the lower end 46 of the peripheral wall 40. The diameter defined by the lower end 46 of the peripheral wall 40 is further defined as a first diameter D1 and tends to be the smallest diameter defined by the peripheral wall 40 within the cavity 52. The diameter defined by the peripheral wall 40 immediately adjacent the bottom wall 34 is further defined as a second diameter D2 and tends to be the largest diameter defined by the peripheral wall 40 within the cavity 52.

When the seed panel 20 is adapted to be coupled to the cup 32, the seed panel 20 typically defines a configuration that is approximately complementary in shape to the cavity 52. The configuration has a perimeter 54, and the perimeter 54 defines a third diameter D3. The third diameter D3 tends to be less than the second diameter D2, but slightly larger than the first diameter D1 defined by the peripheral wall 40. An interference fit is created between the peripheral wall 40 and the seed panel 20 for securing the seed panel 20 within the cavity 52. In other words, the seed panel 20 is forced past the first diameter D1 and into the cavity 52 thereby securing the seed panel 20 therein. Alternatively, the seed panel 20 may be glued, fastened, or otherwise held in place. It is to be appreciated that the type of attachment of the seed panel 20 to the cup 32 is not particularly limited.

Figure 6:
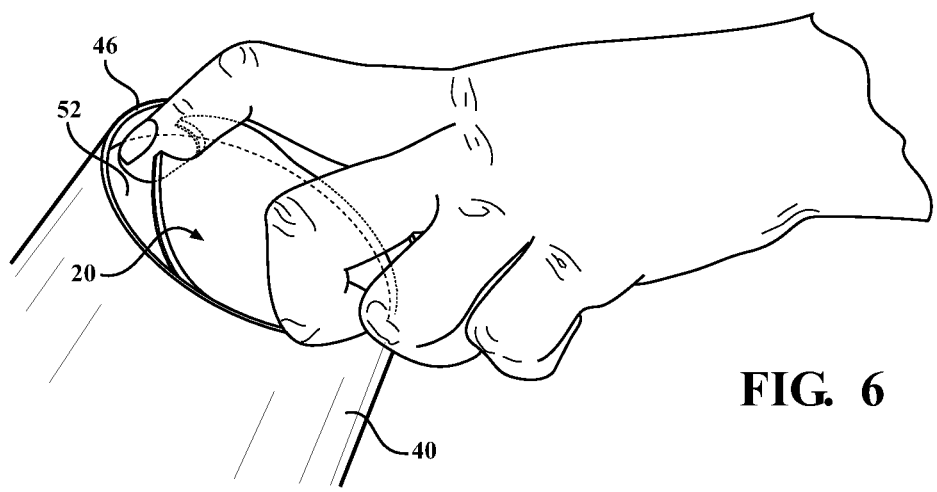
FIG. 6 is a perspective view of a seed panel being manually removed from the cup having a recessed bottom.
Figure 7:
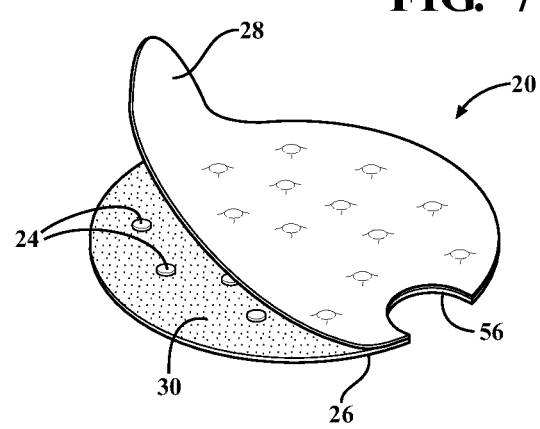
FIG. 7 is a perspective view of a seed panel of another embodiment with the cover element partially peeled off to expose a plurality of seed.

Additionally, the seed panel 20 may define a recess 56 along the perimeter 54 with the recess 56 typically defining a substantially semi-circular configuration. However, it is to be appreciated that the recess 56 is not particularly limited to a specific shape. As shown in FIG. 6, the recess 56 is typically used to remove the seed panel 20 from the cavity 52. A user may insert a finger, or a mechanical device, into the recess 56 to pry or pull the seed panel 20 away from the bottom wall 34, thereby freeing the seed panel 20 from the cavity 52 of the cup 32. After the seed panel 20 is removed from cup 32, the cover element 28 is peeled from the remaining layers 22 of the seed panel 20 for exposing the seed layer 24 in preparation for planting, as illustrated in FIG. 7.

Figure 8:
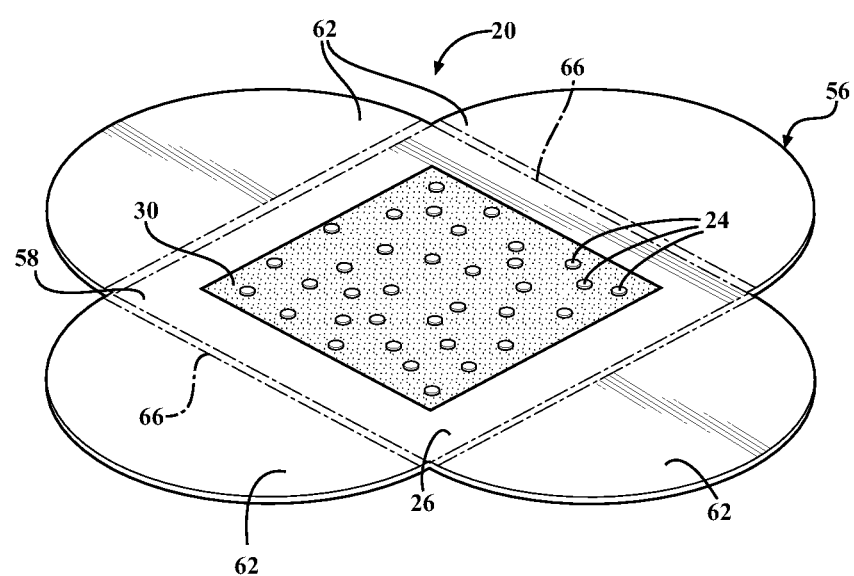
FIG. 8 is a perspective view of another embodiment of the seed panel with the cover element removed to expose a plurality of seeds.
Figure 9:
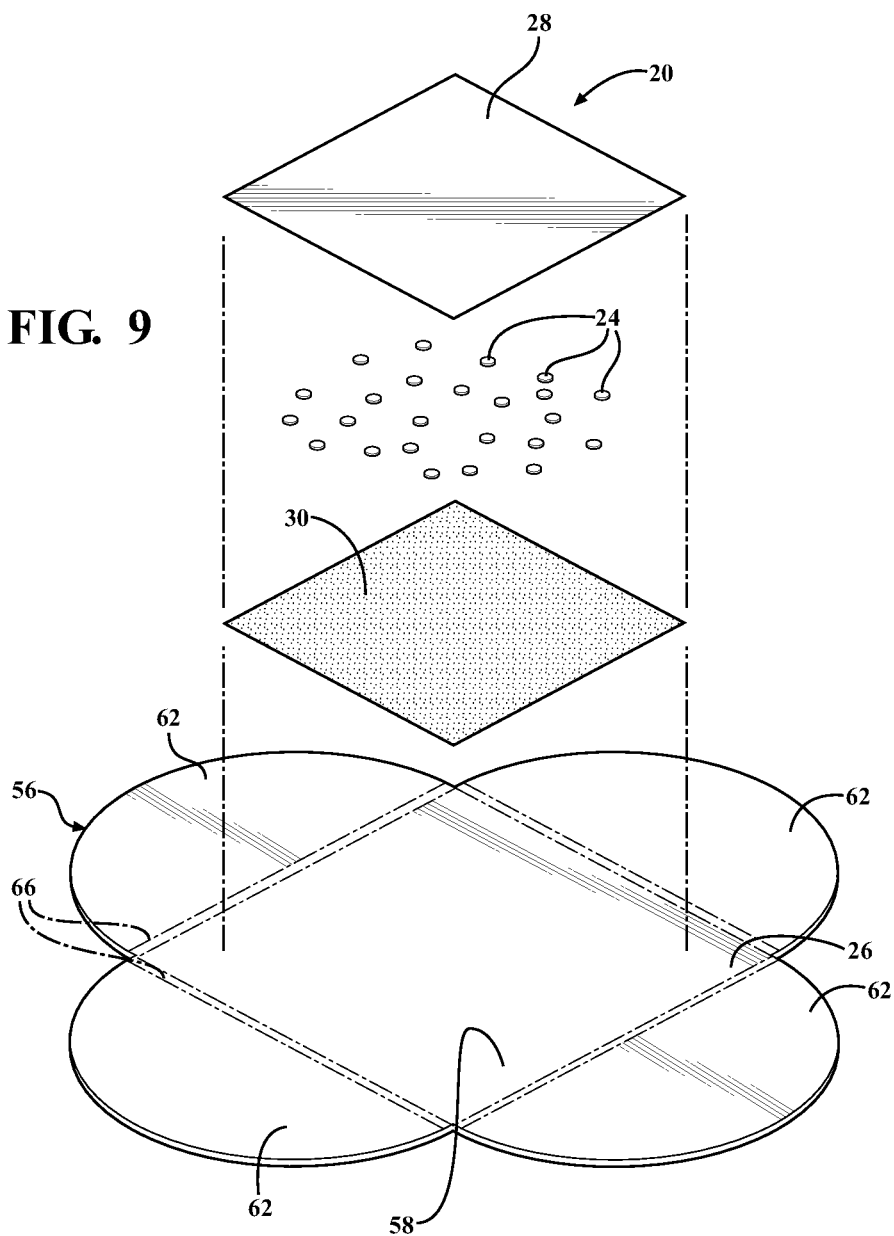
FIG. 9 is an exploded perspective view of another embodiment of the seed panel.

With reference to FIGS. 8 and 9, in another embodiment of the seed panel 20, the substrate element 26 may be larger than and extend beyond the other layers 22. Specifically, the substrate element 26 may be a packaging 58, such as, for example, a CD sleeve for protecting a compact disc. The packaging 58 comprises a base 60 and a plurality of wings 62 extending from the base 60. The adhesive layer 30 may be applied directly onto the base 60 for securing the seed layer 24 thereon. In this embodiment, the cover element 28 is removed for exposing the seed layer 24 and the remaining portions are planted. In other words, the packaging 58 is planted and is no longer used for protecting the compact disc.

Figure 10:
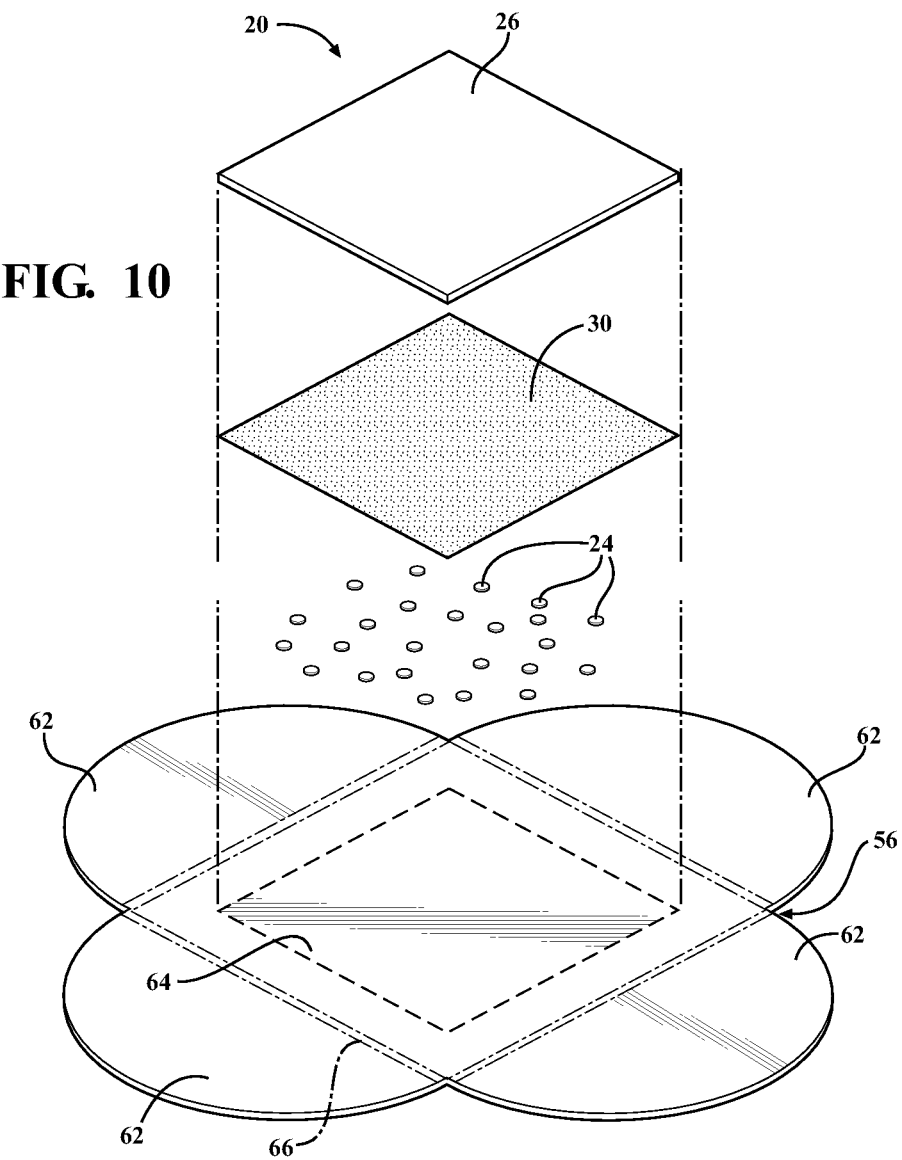
FIG. 10 is an exploded perspective view of another embodiment of the seed panel.

In yet another embodiment, shown in FIG. 10, the packaging 58 may include a release coating 64. The release coating 64 is illustrated with broken lines on the base 60 of the packaging 58. However, it is to be appreciated that the release coating 64 in not necessarily required. The adhesive layer 30 couples the seed layer 24 to the substrate layer and is configured to be peeled away or otherwise removable from the packaging 58 for exposing the seed layer 24. Said differently, in this embodiment the packaging 58 functions as the cover element 28 and the packaging may continue to be used for an intended purpose, e.g. protecting the compact disc.

Figure 11:
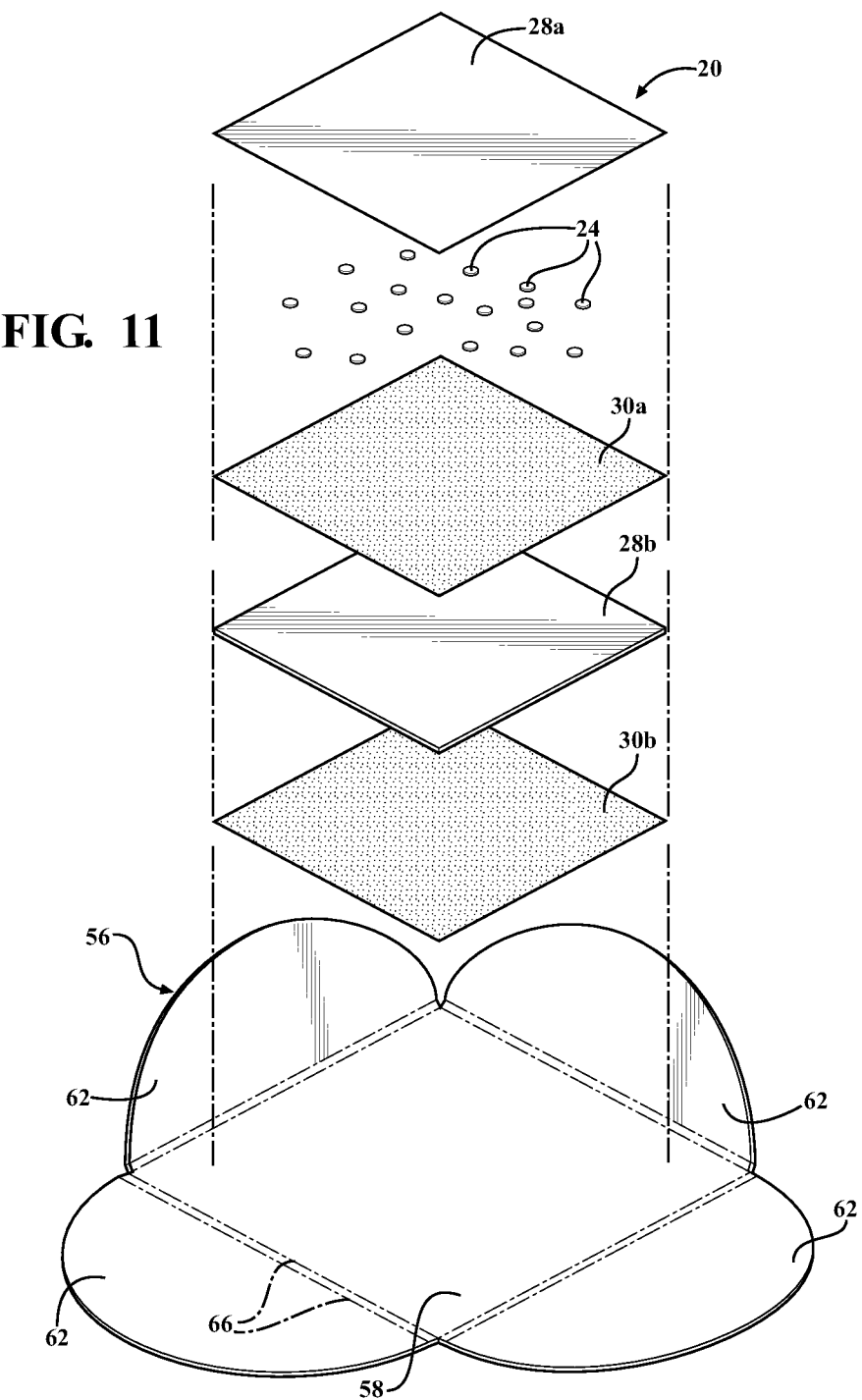
FIG. 11 is exploded perspective view of another embodiment of the seed panel.
Figure 12:
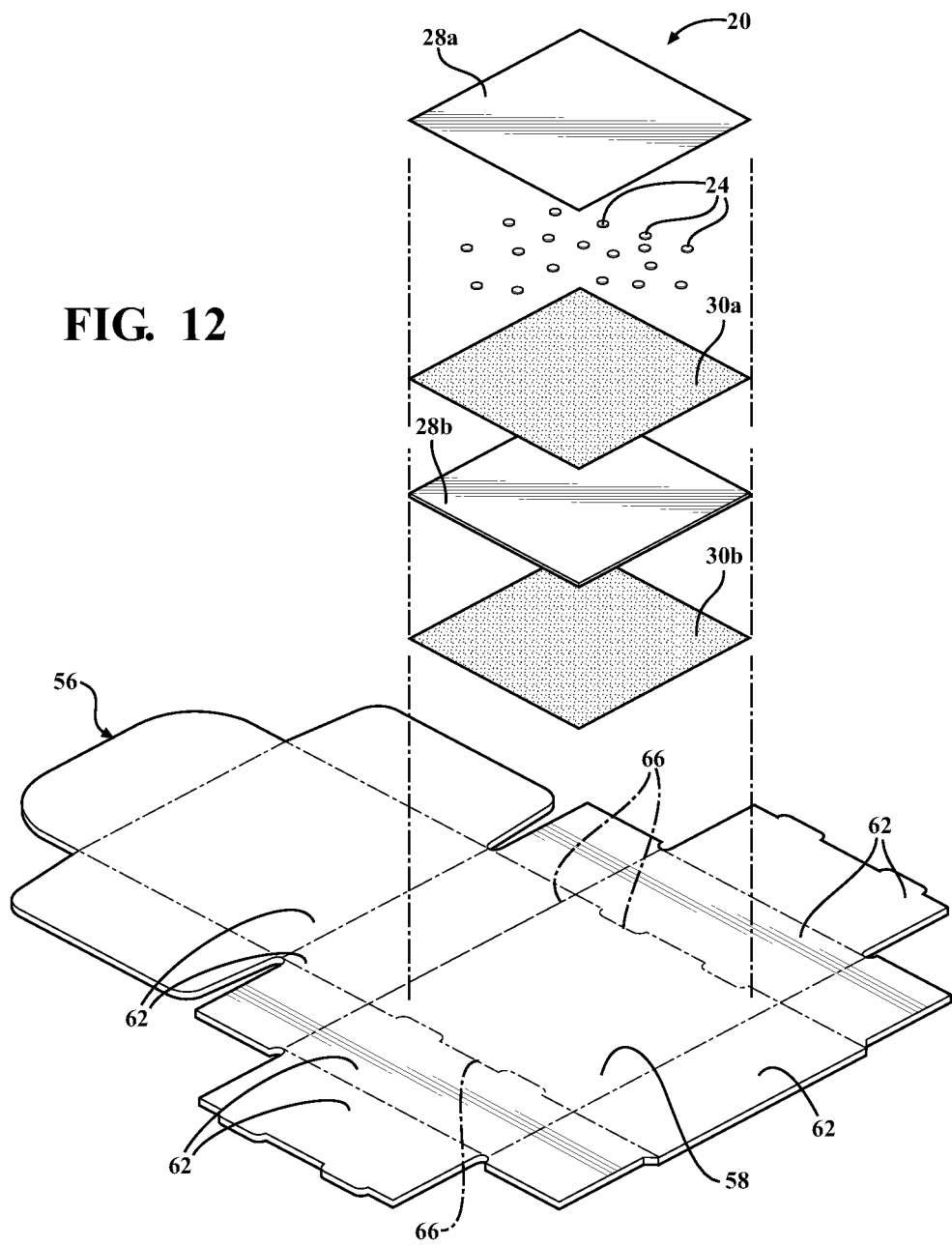
FIG. 12 is exploded perspective view of another embodiment of the seed panel.
Figure 13:
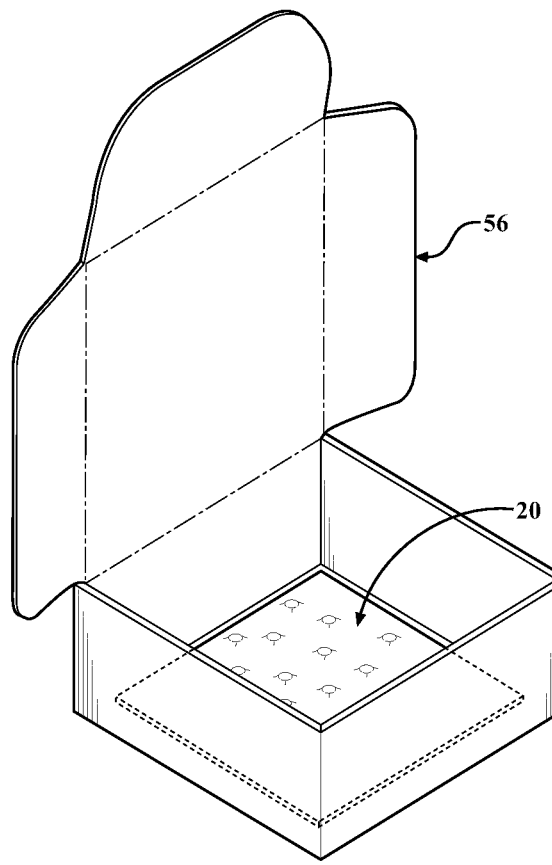
FIG. 13 is a perspective view of the seed panel disposed on packaging.

In still another embodiment, additional layers 22 may be added to the seed panel 20. With reference to FIGS. 11-13, the adhesive layer 30 may be further defined as a first adhesive layer 30*a* and a second adhesive layer 30*b*. Additionally, the cover element 28 may be further defined as a first cover element 28*a* and a second cover element 28*b*. In this embodiment, the second cover element 28*b* may comprise a rigid or a semi-rigid material. The second cover element 28*b* may also include the release coating 64 on at least one side for facilitating removal from the second adhesive layer 30*b*, while remaining coupled to the first adhesive layer 30*a*. In other words, the first cover element 28*a* may comprise a different material than the second cover element 28*b*. In this embodiment, the seed panel 20 is removed from the packaging 58 and the packaging 58 may continue to be used, e.g. protecting a compact disc, after the seed panel 20 is removed. It is to be appreciated that other embodiments the additional layers 22 may not necessarily be required to allow the packaging 58 to be reused after removal of the seed panel 20.

Referring specifically to FIGS. 11 and 13. The packaging 58 is typically formed in a flat state with creases 66 formed between the base 60 and the wings 62. The wings 62 are folded along the creases 66 and toward the base 60 to form the three-dimensional structure.

Figure 14:
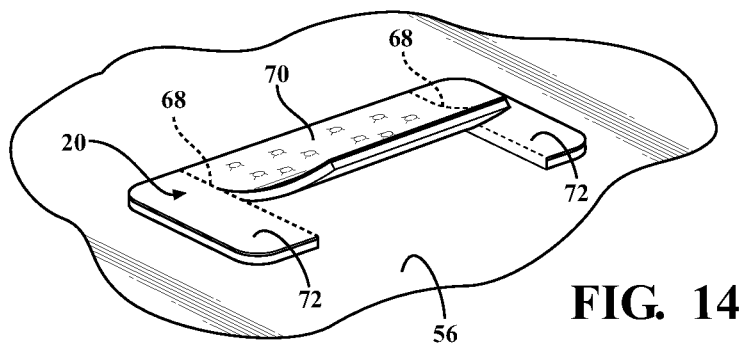
FIG. 14 is a perspective view of another embodiment of the seed panel partially removed from packaging.

With reference to FIG. 14, the seed panel 20 may include perforations 68. The perforations 68 divides the seed panel 20 into a central portion 70 and a plurality of outer portions 72. In this embodiment, the seed panel 20, including the central portion 70 and the outer portions 72 are affixed to the packaging 58. The central portion 70 may be torn from the outer portions 72 along the perforations 68 to remove the central portion 70 from the packaging 58. After being removed from the packaging 58, the central portion 70 functions as the seed panel 20, as described above. The cover element 28 may be peeled away from the substrate element 26 to expose the seed layer 24 in preparation for planting.

The present disclosure also contemplates a method of forming the seed panel 20. The method may include the step of providing a substrate element 26. The method may also include the step of providing an adhesive. The adhesive may be applied, for example, by spraying, rolling, sheeting, filming, etc. The method may also include the step of applying the adhesive to the substrate to form an adhesive layer 30. The method may also include the step of providing at least one seed. The method may also include the step of applying the seed to the adhesive layer 30. The method may also include the step of providing a cover element 28. The method may also include the step of applying the cover element 28 over the seed and substrate element 26. The method may also include the step of applying pressure to adhere the substrate element 26 to the cover element 28 for securing the seed therebetween. The method may also include the step of applying heat for promoting adhesion of the substrate element 26 and the cover element 28. The method may also include the step of cutting the composite of the packaging 58 to form the seed panel 20.

The present disclosure further contemplates a method of planting seed with the seed panel 20. As described above, the seed panel comprises the substrate element 26 and the cover element 28 spaced from the substrate element 26. The adhesive layer 30 is disposed between and couples the cover element 28 and the substrate element 26 to one another. At least one seed is disposed between the elements 26, 28 and abuts the adhesive layer 30. The seed panel 20 may be removably coupled to a secondary structure. The method may include the step of removing the seed panel 20 from the secondary structure. The method may further include the step of separating the elements 26, 28 apart to expose the seed of the seed layer 24. The method may further include the step of soaking the seed panel 20 in a solution to facilitate separation of the elements 26, 28. The method may further include the step of disposing at least one of the elements 26, 28 having at least one seed disposed thereon in or on a growing medium to plant the seed. The method may further include the step of applying water to the seed and growing medium to facilitate germination of the seed. The terms "disposing the elements" may be further define as placing at least one of the elements 26, 28 with the seed disposed thereon atop the growing medium. Alternatively, the terms "disposing the elements" may be further define as placing at least one of the elements 26, 28 with the seed disposed thereon within the growing medium. It is to be appreciated that the growing medium is not particularly limited, and may include, but is not limited to, soil, dirt, gel, peat, sand, wood residues, hydroponic media, or any other suitable material.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that reference numerals are merely for convenience and are not to be in any way limiting, the invention may be practiced otherwise than as specifically described.

What is claimed is:

1. A composite article comprising:
   a substrate element;
   a cover element spaced from said substrate element;
   a release layer disposed between said cover element and said substrate element;
   a first adhesive layer disposed between said cover element and said release layer, said first adhesive layer configured to adhere said cover element to said release layer;
   a second adhesive layer disposed between said release layer and said substrate element, said second adhesive layer configured to adhere said release layer to said substrate element; and
   a seed layer comprising at least one seed disposed between said cover element and said release layer and abutting said first adhesive layer;
   wherein said cover element is removable from said first adhesive layer to expose at least a portion of said seed layer.

2. The composite article as set forth in claim 1 wherein at least one of said first and second adhesive layers comprise a pressure-sensitive adhesive.

3. The composite article as set forth in claim 1 wherein at least one of said first and second adhesive layers comprise a biodegradable adhesive material.

4. The composite article as set forth in claim 1 wherein at least one of said substrate element, said cover element, and said release layer comprise a biodegradable material.

5. The composite article as set forth in claim 1 wherein said first adhesive layer is configured to couple said seed layer to said release layer.

6. The composite article as set forth in claim 1 wherein said cover element is separable from said release layer to expose said at least one seed of said seed layer.

7. The composite article as set forth in claim 1 wherein said release layer comprises a release coating for removal of said release layer from said second adhesive layer and said substrate element.

8. The composite article as set forth in claim 7 wherein said substrate element is reusable after said release layer is removed.

9. The composite article as set forth in claim 1 wherein said release layer and said first adhesive layer remain coupled to said at least one seed when said cover element is removed.

10. The composite article as set forth in claim 9 wherein said substrate element, said release layer, said first adhesive layer, said second adhesive layer, and said at least one seed of said seed layer are plantable for germinating said at least one seed.

11. The composite article as set forth in claim 1 wherein the substrate element is flat and comprises a plurality of creases forming a plurality of wings, and wherein the substrate element is configured to be folded along the creases to form a three-dimensional structure.

* * * * *